US012803424B2

(12) United States Patent
Liu et al.

(10) Patent No.: US 12,803,424 B2
(45) Date of Patent: Nov. 17, 2026

(54) METHOD AND DEVICE OF CONTROLLING POWER FACTOR CORRECTOR

(71) Applicant: Murata Manufacturing Co., Ltd., Nagaokakyo (JP)

(72) Inventors: Chuipong Liu, Hong Kong (CN); Chukhung Chan, Hong Kong (CN)

(73) Assignee: MURATA MANUFACTURING CO., LTD., Kyoto (JP)

(*) Notice: Subject to any disclaimer, the term of this patent is extended or adjusted under 35 U.S.C. 154(b) by 155 days.

(21) Appl. No.: 18/817,471

(22) Filed: Aug. 28, 2024

(65) Prior Publication Data

US 2025/0079977 A1 Mar. 6, 2025

(30) Foreign Application Priority Data

Aug. 28, 2023 (CN) ......................... 202311103016.0

(51) Int. Cl.
*H02M 1/42* (2007.01)

(52) U.S. Cl.
CPC ....... *H02M 1/4208* (2013.01); *H02M 1/4225* (2013.01); *H02M 1/4233* (2013.01)

(58) Field of Classification Search
CPC ............. H02M 1/4225; H02M 1/4208; H02M 1/4233; H02M 1/4258; H02M 1/4291
See application file for complete search history.

(56) References Cited

U.S. PATENT DOCUMENTS

| | | | | |
|---|---|---|---|---|
| 9,374,001 | B1 * | 6/2016 | Subramaniam | H02M 1/42 |
| 2014/0091720 | A1 * | 4/2014 | Brinlee | H05B 45/375 315/186 |
| 2016/0105095 | A1 * | 4/2016 | Mayell | H02M 1/4225 323/205 |
| 2024/0396473 | A1 * | 11/2024 | Phadke | H02M 1/007 |

* cited by examiner

*Primary Examiner* — Ryan Johnson

(74) *Attorney, Agent, or Firm* — Keating & Bennett, LLP

(57) ABSTRACT

A power factor corrector (PFC) is used to receive input power and supply power to a load via a DC/DC converter. A method of controlling a PFC is executed by a PFC controller used to control the PFC, where the PFC controller includes a voltage controller. The method includes receiving a first signal transmitted from a DC/DC controller used to control the DC/DC converter, where the first signal indicates the load, deriving a second signal based on the first signal, where the second signal is an expected output control signal of the voltage controller under the load indicated by the first signal, and configuring the voltage controller according to the second signal so as to keep an output voltage $V_{bulk}$ of the PFC to the DC/DC converter stable.

14 Claims, 7 Drawing Sheets

METHOD AND DEVICE OF CONTROLLING POWER FACTOR CORRECTOR

CROSS REFERENCE TO RELATED APPLICATIONS

This application claims the benefit of Chinese Patent Application No. 202311103016.0 filed on Aug. 28, 2023, the whole disclosure of which is incorporated herein by reference.

BACKGROUND OF THE INVENTION

1. Field of the Invention

The present disclosure relates to methods and devices to control a power factor corrector (PFC).

2. Description of the Related Art

A power factor corrector (PFC) is commonly used as a front-end converter, which ensures power supply units having a high power factor and a low input current distortion (i.e., good input current total harmonic distortion (iTHD)). FIG. 1 is a schematic diagram showing a power supply unit with a conventional PFC control. The voltage unit may include a PFC 101, a PFC controller 103, a DC/DC converter 105, and a DC/DC controller 107. The PFC 101 may receive an input power and may supply a power to a load via the DC/DC converter 105. The PFC 101 may be controlled by the PFC controller 103. The DC/DC converter 105 may be controlled by the DC/DC controller 107. PFC control usually involves two control loops, as shown in FIG. 1. An inner control loop is a fast response input current control loop which shapes the input current according to an input sinusoidal waveform. This ensures that the input current meets a low iTHD requirement. An outer control loop is a slow response PFC output voltage control loop which regulates the output to an expected voltage (defined by a reference signal $V_{ref}$). This voltage control loop outputs a control signal $VCL_{op}$ which adjusts a current reference signal $I_{ref}$, so that the input current may be controlled. Then adjusting the $VCL_{op}$ signal may change the input power of the PFC and may keep the output voltage $V_{bulk}$ of the PFC stable for different output loads. The PFC control is well known to those skilled in the art and will not be described in detail here.

Theoretically, the output voltage $V_{bulk}$ of the PFC should have an output voltage ripple with a ripple frequency equal to 2 times the line frequency. It is because the input voltage and current are rectified AC with 2 times the line frequency, and charging and discharging the PFC output capacitor in each AC half cycle creates the voltage ripple. The voltage control loop response should be slow, so that it will not respond to the voltage ripple in the output voltage $V_{bulk}$. That means the bandwidth of the voltage control loop is much lower than 2 times the input line frequency. If the voltage control loop respond is too fast, the control output $VCL_{op}$ will be changed continuously within a half AC input cycle. This will distort the current reference signal $I_{ref}$ and will affect the iTHD and the power factor of the PFC.

Good output dynamic load response is a common requirement for the DC/DC converter 105. Some computer systems even require 5% to 100% step load change within a millisecond with an output voltage drop of less than 1%. The output dynamic load response depends on the DC/DC controller 107 and also on the steadiness of the output voltage $V_{bulk}$. When a high step load occurs in the DC/DC converter output, the PFC output also experiences a high step load, which increases overshoot or undershoot of the output voltage $V_{bulk}$ of the PFC, because the PFC voltage control loop has a slow response.

FIGS. 2A and 2B show waveforms of an undershoot of the output voltage $V_{bulk}$ of the PFC when the DC/DC converter output experiences a high step load (e.g., the output current Iout changes from 20 A to 70 A). FIGS. 3A and 3B show waveforms of an overshoot of the output voltage $V_{bulk}$ of the PFC when the DC/DC converter output experiences a high step load (e.g., the output current Iout changes from 70 A to 20 A). FIGS. 2B and 3B are the 5-fold magnified versions of FIGS. 2A and 3A, respectively. The output voltage $V_{bulk}$ has a large undershoot and overshoot that hit protection thresholds, which limits further drops or rises in the output voltage $V_{bulk}$ in the cases that the output current Iout changes from 20 A to 70 A and that the output current Iout changes from 70 A to 20 A, respectively.

The large undershoot and overshoot of the output voltage $V_{bulk}$ disrupt stability of the DC/DC converter 105, thereby affecting the output dynamic load response of the DC/DC converter 105. Therefore, it is desired to provide an effective method to keep the stability of the output voltage $V_{bulk}$ of the PFC when the output of the DC/DC converter 105 experiences a high step load.

SUMMARY OF THE INVENTION

Example embodiments of the present invention provide methods and devices to eliminate overshoot or undershoot of an output voltage $V_{bulk}$ of a PFC when a DC/DC converter output experiences a high step load.

An example embodiment of the present invention provides a method of controlling a power factor corrector (PFC), where the PFC is configured or programmed to receive an input power and to supply a power to a load via a DC/DC converter, the method is executable by a PFC controller configured or programmed to control the PFC, and the PFC controller includes a voltage controller.

The method includes receiving a first signal transmitted from a DC/DC controller configured or programmed to control the DC/DC converter, the first signal indicating the load; deriving a second signal based on the first signal, the second signal being an expected output control signal of the voltage controller under the load indicated by the first signal, and configuring the voltage controller according to the second signal so as to keep an output voltage $V_{bulk}$ of the PFC to the DC/DC converter stable.

According to an example embodiment of the present disclosure, the voltage controller may be configured or programmed to generate an output control signal $VCL_{op}$, where the configuring the voltage controller according to the second signal includes according to the second signal, selectively generating the output control signal $VCL_{op}$ based on a difference between a reference voltage signal and the output voltage $V_{bulk}$ of the PFC, or setting the output control signal $VCL_{op}$ to be equal to the second signal.

According to an example embodiment of the present disclosure, the PFC controller may further include a current controller, the current controller may be configured or programmed to receive a difference of a current $I_{PFC}$ of the PFC and a product of a reference current signal and a constant K as an input so that the current $I_{PFC}$ of the PFC is controlled to be equal to the product of the reference current signal and the constant K, where the constant K may be a constant scaling factor.

According to an example embodiment of the present disclosure, the first signal may be an output power $P_{out}$ of the DC/DC converter.

According to an example embodiment of the present disclosure, the deriving a second signal may include obtaining the second signal by dividing the output power $P_{out}$ by a product of an efficiency η and a constant K, where the efficiency η indicates an efficiency of supplying the power to the load from the input power, the constant K may be a constant scaling factor, and a current $I_{PFC}$ of the PFC is controlled to be equal to a product of a reference current signal and the constant K.

According to an example embodiment of the present disclosure, there is no root mean square (RMS) filter in the PFC controller, and the second signal is obtained by dividing the output power $P_{out}$ by a product of a square of a root mean square value of the input voltage $V_{in}$, the efficiency η and the constant K.

According to an example embodiment of the present disclosure, the configuring the voltage controller according to the second signal may include when an absolute value of a difference between the second signal and the output control signal $VCL_{op}$ is greater than a threshold value, setting the output control signal $VCL_{op}$ to be equal to the second signal, and changing a related state variable of the voltage controller so that the voltage controller jumps to a state that matches a latest input power.

According to an example embodiment of the present disclosure, the threshold value may be a specific percentage of a value of the output control signal $VCL_{op}$ at a steady state full load.

According to an example embodiment of the present disclosure, the voltage controller may use a proportional-integral-derivative PID control, and the configuring the voltage controller according to the second signal may include when the absolute value of the difference is less than or equal to the threshold value, determining a sum of a proportional variable, an integral variable, and a derivative variable as the output control signal $VCL_{op}$, and when the absolute value of the difference is greater than the threshold value, setting the output control signal $VCL_{op}$ to be equal to the second signal, and setting the integral variable to be equal to the second signal.

According to an example embodiment of the present disclosure, the first signal transmitted from the DC/DC controller is received via a signal transmitter across a safety isolation barrier between the PFC controller and the DC/DC controller.

According to an example embodiment of the present disclosure, the first signal is transmitted in a digital form, and the transmission of the first signal, including an encoding and a decoding, is completed within a half milli-second.

An example embodiment of the present invention provides a power factor corrector (PFC) controller configured or programmed to control a power factor corrector PFC, where the PFC may be configured or programmed to receive an input power and to supply a power to a load via a DC/DC converter. The PFC controller may include a voltage controller and may be configured or programmed to receive a first signal from a DC/DC controller, the first signal indicating the load, derive a second signal based on the first signal, the second signal being an expected output control signal of the voltage controller under the load indicated by the first signal, and configure the voltage controller according to the second signal, so as to keep an output voltage $V_{bulk}$ of the PFC to the DC/DC converter stable.

An example embodiment of the present invention provides a power supply apparatus, including a DC/DC converter, a power factor corrector PFC configured or programmed to receive an input power and to supply a power to a load via the DC/DC converter, a DC/DC controller configured or programmed to control the DC/DC converter and transmit a first signal; and a PFC controller configured or programmed to receive the first signal from the DC/DC controller, the first signal indicating the load, derive a second signal based on the first signal, the second signal being an expected output control signal of a voltage controller included in the PFC controller under the load indicated by the first signal, and configure the voltage controller according to the second signal so as to keep an output voltage $V_{bulk}$ of the PFC to the DC/DC converter stable.

According to an example embodiment of the present disclosure, the stable output voltage $V_{bulk}$ improves the dynamic response of output voltage $V_{out}$ of the DC/DC converter, and at the same time keeps the PFC voltage control loop respond slow so that the input power factor and the iTHD performance are not affected.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Hereinafter, the example embodiments of the present disclosure will be described with reference to the accompanying drawings. However, it should be understood that these descriptions are only illustrative and not intended to limit the scope of the present disclosure. In addition, in the following explanation, descriptions of well-known structures and techniques are omitted to avoid unnecessary confusion with the concepts of the present disclosure.

The terms used here are only intended to describe specific example embodiments and are not intended to limit the present disclosure. The words "a", "one", "the" etc. used here should also include the meanings of "multiple" and "a plurality of", unless the context clearly indicates otherwise. In addition, the terms "include", "contain", etc. used here indicate the existence of the features, steps, operations, and/or components, but do not exclude the existence or addition of one or more other features, steps, operations, or components.

All terms (including technical and scientific terms) used here have the meaning commonly understood by those skilled in the art, unless otherwise defined. It should be noted that the terms used here should be interpreted as having a meaning consistent with the context of this specification, and should not be interpreted in an idealized or overly rigid manner.

As mentioned above, good output dynamic load response is a common requirement for the DC/DC converter. Some computer systems even require 5% to 100% step load change within a milli-second with an output voltage drop of less than 1%. The dynamic load response depends on the DC/DC controller and also on the steadiness of the output voltage $V_{bulk}$. When a high step load occurs in the DC/DC converter output, the PFC output also experiences a high step load, which increases the overshoot or undershoot of the output voltage $V_{bulk}$, because the PFC voltage control loop has a slow response.

Figure 1:
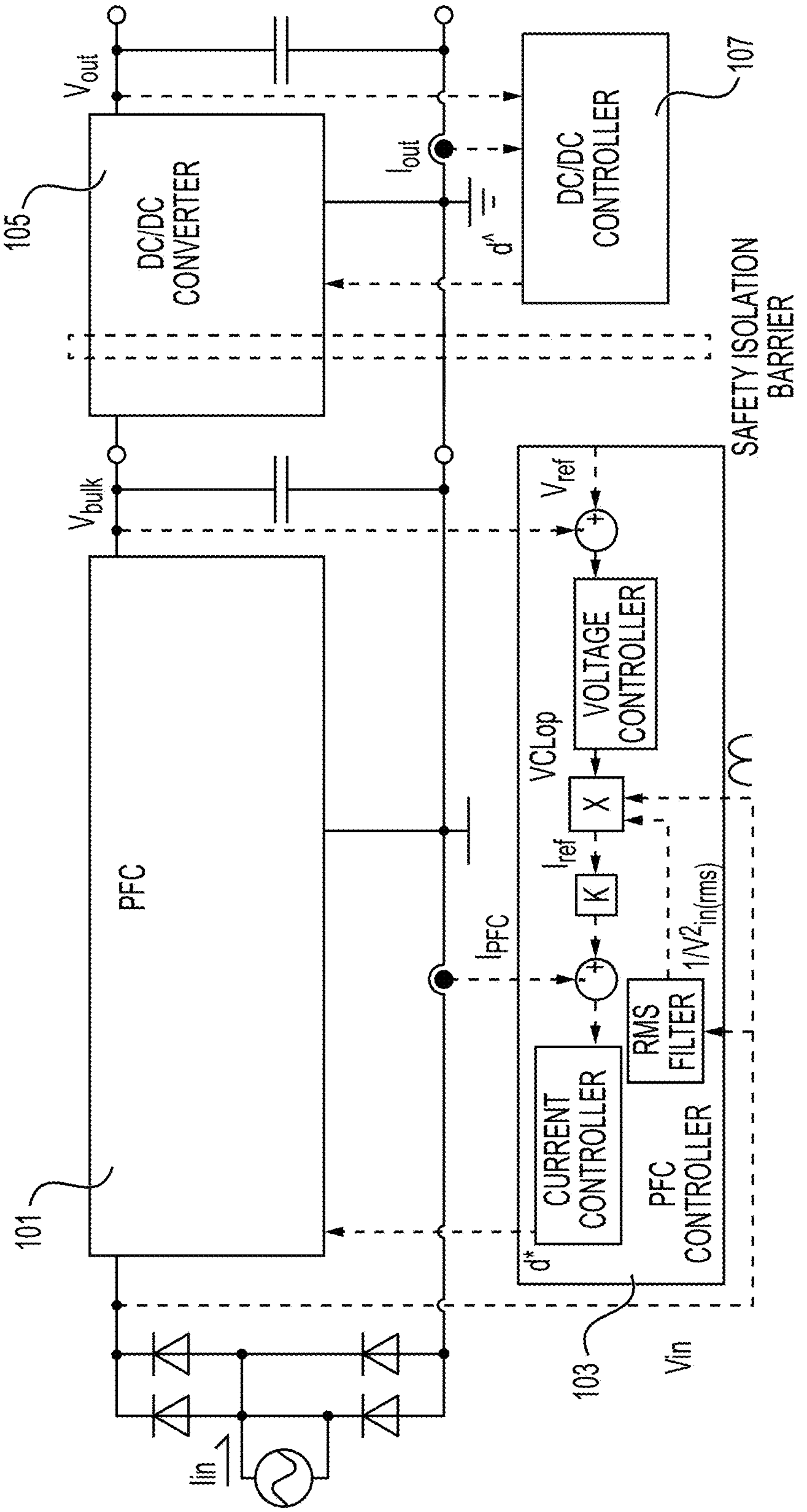
FIG. 1 PRIOR ART
FIG. 1 is a schematic diagram showing a power supply unit with a conventional PFC control.
Figure 2A:
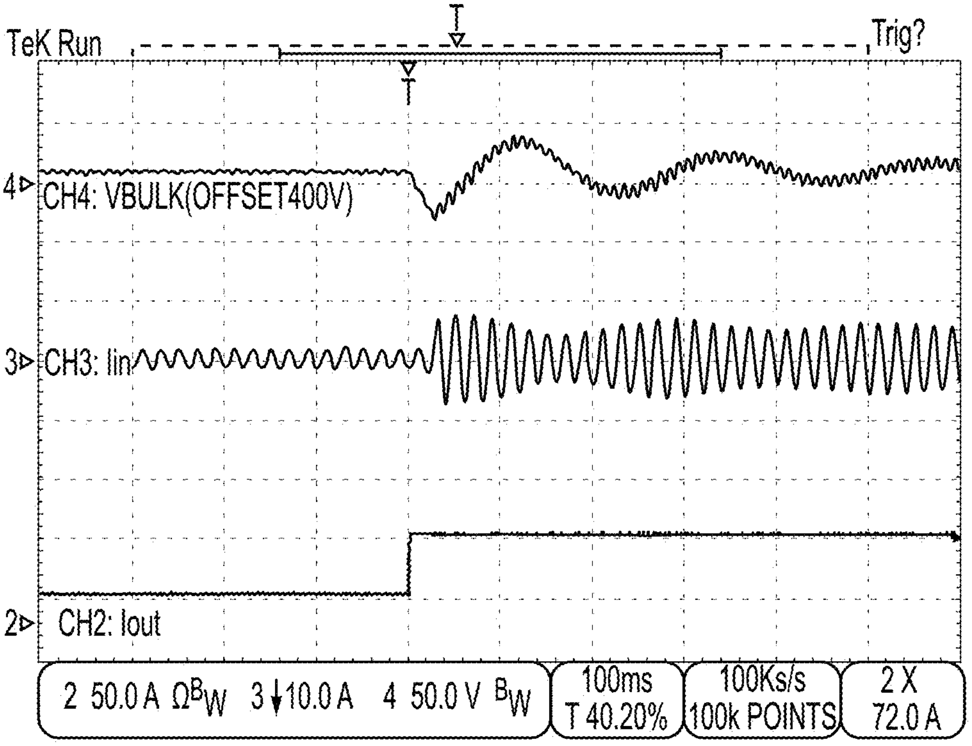
FIG. 2A PRIOR ART
FIGS. 2A and 2B show waveforms of an undershoot of the output voltage $V_{bulk}$ of the PFC when the DC/DC converter output experiences a high step load (the output current Iout changes from 20 A to 70 A).
Figure 2B:
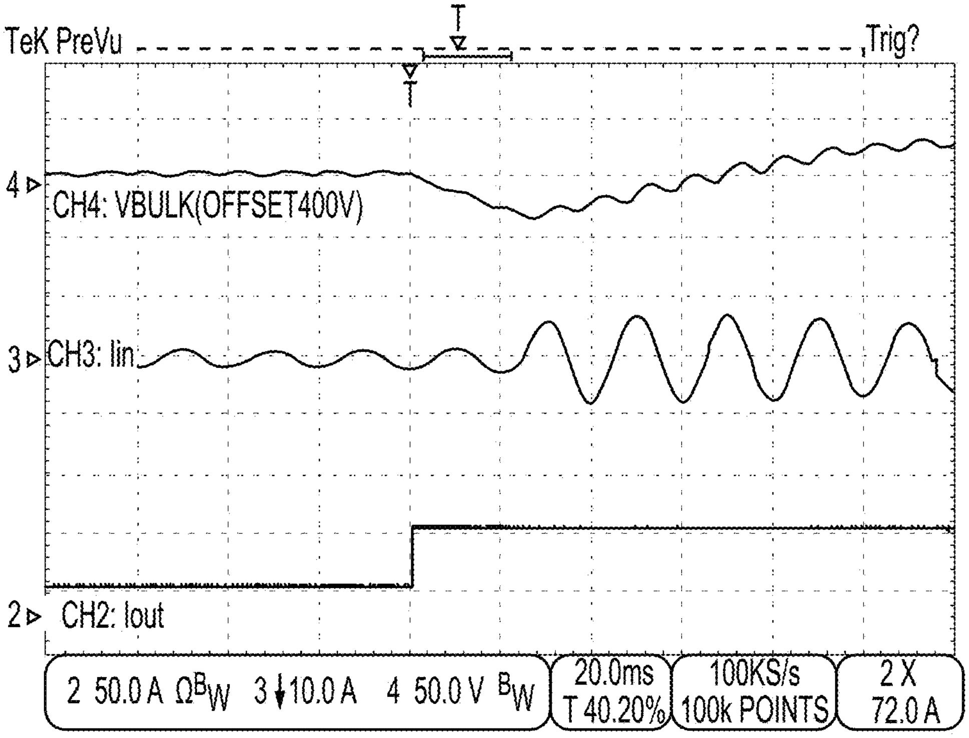
FIG. 2B PRIOR ART
Figure 3A:
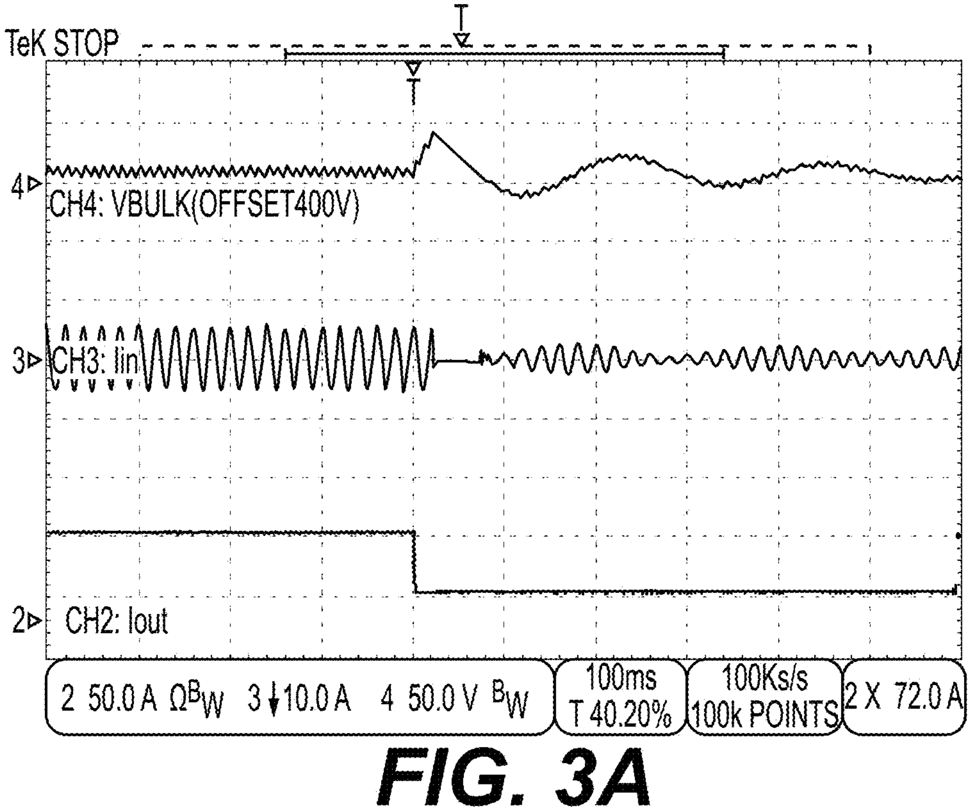
FIG. 3A PRIOR ART
FIGS. 3A and 3B show waveforms of an overshoot of the output voltage $V_{bulk}$ of the PFC when the DC/DC converter output experiences a high step load (the output current Iout changes from 70 A to 20 A).
Figure 3B:
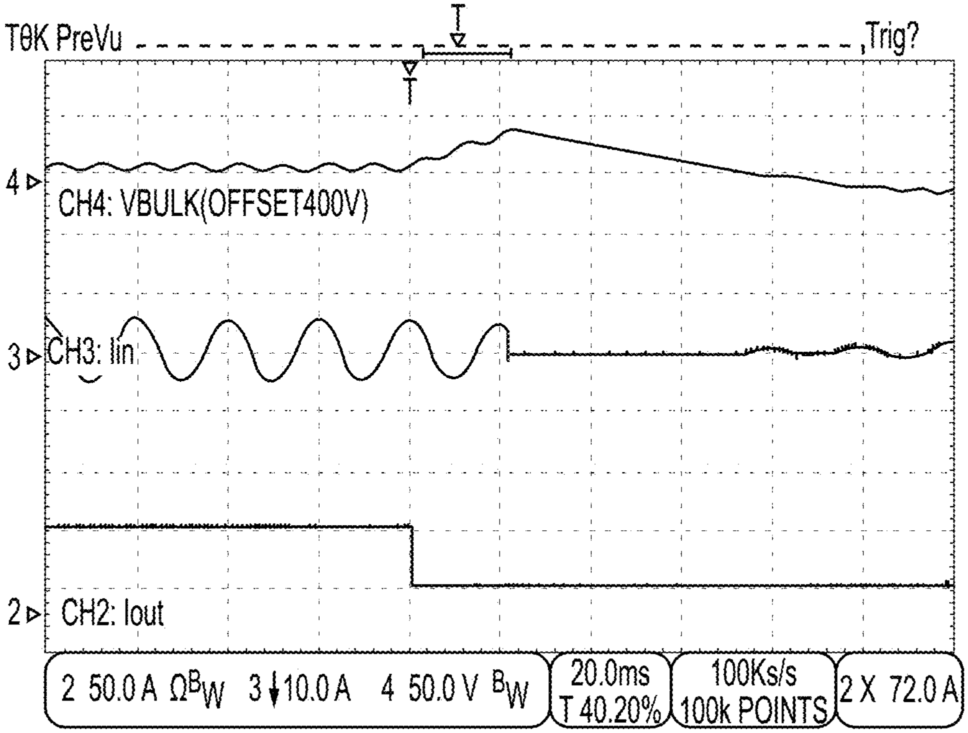
FIG. 3B PRIOR ART
Figure 4:
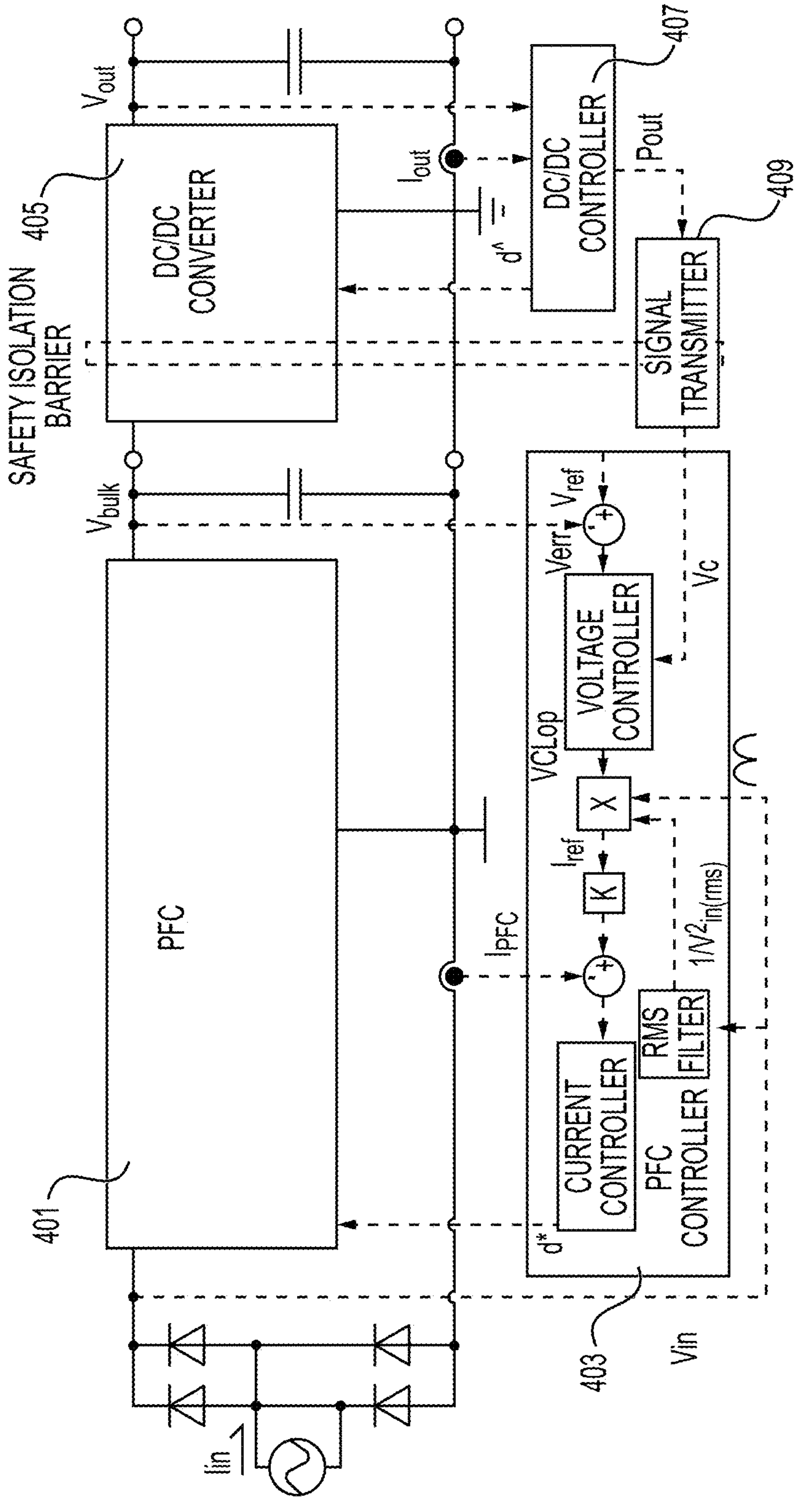
FIG. 4 is a schematic diagram showing a power supply unit with a PFC control according to an example embodiment of the present invention.

In order to solve one or more of the above problems, the example embodiments of the present disclosure provide concepts to achieve output control of the PFC through the feedforward function. FIG. 4 is a schematic diagram showing a power supply unit with PFC control according to an example embodiment of the present disclosure.

The power supply unit may include a PFC 401, a PFC controller 403, a DC/DC converter 405, and a DC/DC controller 407. The PFC 401 may typically be connected to the DC/DC converter 405 and may receive an input power and may supply a power to a load via the DC/DC converter 405. The PFC controller 403 may include a voltage controller. In addition, the DC/DC converter 405 may typically have a safety isolation barrier. However, the concepts of the present disclosure are applicable regardless of the presence or absence of the safety isolation barrier.

According to an example embodiment of the present disclosure, the PFC controller 403 may further include a current controller. The current controller may be configured or programmed to receive a difference of a current $I_{PFC}$ of the PFC 401 and a product of a reference current signal and a constant K as an input so that the current $I_{PFC}$ of the PFC 401 may be controlled to be equal to the product of the reference current signal and the constant K. In this example embodiment, the constant K may be a constant scaling factor and a positive number. Depending on the scaling, the constant K may be greater than or less than 1.

According to an example embodiment of the present disclosure, the DC/DC controller 407 may acquire the output voltage $V_{out}$ and the output current $I_{out}$ signals for control purposes so that it may transmit an additional output power $P_{out}$ signal (or the output current $I_{out}$ signal assuming the output voltage $V_{out}$ is unchanged) to the PFC controller 403. However, the present disclosure is not limited to this. The DC/DC controller 407 may transmit other signals to the PFC controller 403, as long as these signals enable the PFC controller 403 to achieve the stability of the output voltage $V_{bulk}$ when the DC/DC converter output experiences the high step load.

In order to have a fast response of the output voltage $V_{bulk}$ to the change of the output load, the transmission of output power $P_{out}$ should be fast. It is better for the DC/DC controller 407 to output a continuous analog output power $P_{out}$ signal and to input the output power $P_{out}$ signal to the PFC controller 403. If there is a safety isolation barrier between the two controllers, some high-speed analog signal transmission devices with input/output isolation should be used.

Therefore, according to an example embodiment of the present disclosure, the power supply unit may further include a signal transmitter 409. This may be an advanced isolated analog signal transmitter or may be a signal transmitter using a high-frequency pulse width modulation (PWM) signal together with an optical or magnetic isolator.

The latter signal transmitter converts the output power $P_{out}$ signal to a high frequency PWM signal (e.g. the duty cycle is proportional to output power $P_{out}$). The PWM signal is transmitted to the PFC controller through an opto-coupler or a signal transformer and then filtered back to an analog signal. The output power $P_{out}$ signal may also be transmitted in a digital form, but transmission, encoding, and decoding speeds must be fast enough (e.g. complete within a half milli-second).

In the following, a method executed by the PFC controller 403 is described with reference to FIG. 5.

Figure 5:
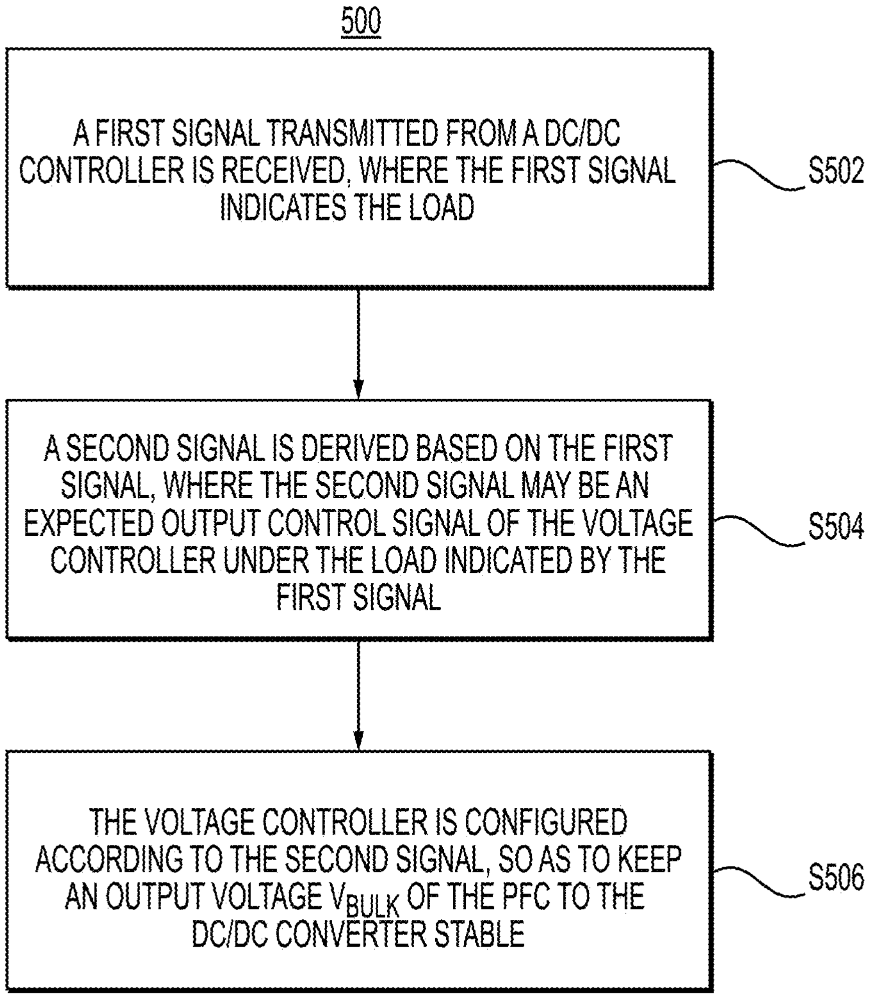
FIG. 5 is a flowchart of a method of controlling the PFC executed by the PFC controller according to an example embodiment of the present invention.

FIG. 5 is a flowchart of a method 500 of controlling the PFC executed by the PFC controller according to an example embodiment of the present disclosure.

In step S502, a first signal transmitted from a DC/DC controller may be received. The first signal may indicate the load.

In an example embodiment of the present disclosure, the first signal may be an output power $P_{out}$ of the power supply unit. In this example embodiment, in a case that there is a safety isolation barrier between the PFC controller and the DC/DC controller, the first signal from the DC/DC controller may be received via the above-mentioned signal transmitter.

In step S504, a second signal is derived based on the first signal (e.g. the output power $P_{out}$). In an example embodiment of the present disclosure, the second signal may be an expected output control signal of the voltage controller under the load indicated by the first signal.

Referring to FIG. 4, after receiving the output power $P_{out}$ signal transmitted from the DC/DC controller 407, the PFC controller 403 may calculate a Vc signal (i.e. the second signal) which equals to the expected $VCL_{op}$ signal after the load changes. The new $VCL_{op}$ signal increases/decreases reference current $I_{ref}$, so that the input current of the PFC may be adjusted to the expected amplitude in a short time. The specific calculation process of the Vc signal is described below.

In this example embodiment, let η be an efficiency of the power supply unit, and the efficiency η may represent the efficiency of supplying the power to the load from the input power, that is:

$$P_{in} = P_{out}/\eta \qquad \text{(Equation 1)}$$

where $P_{in}$ is the input power of the power supply unit, and $P_{out}$ is the output power of the power supply unit.

In addition, the current $I_{PFC}$ of the PFC may be controlled by the current controller mentioned above to meet the following equation with the reference current $I_{ref}$:

$$I_{PFC} = K \times I_{ref},$$

where K may be a constant scaling factor and a positive number. Depending on the scaling, the constant K may be greater than, equal to, or less than 1.

The input power ($P_{in}=V_{in(rms)}\times I_{PFC(rms)}$) of the power supply unit may thus be calculated by the following equation:

$$P_{in} = V_{in(rms)} \times K \times I_{ref(rms)} \quad \text{(Equation 2)}$$

where the subscript rms may represent a root mean square value of the variable, for example, $V_{in(rms)}$ may represent the root mean square value of input voltage $V_{in}$.

In addition, according to an example embodiment of the present disclosure, as a signal that may replace the normal voltage controller output $VCL_{op}$, as shown in the example in FIG. 4, the Vc signal should have the following relationship with the reference current $I_{ref}$:

$$I_{ref} = Vc \times V_{in} / V_{in(rms)}^2$$

$$I_{ref(rms)} = Vc \times V_{in(rms)} / V_{in(rms)}^2$$

Therefore, $I_{ref(rms)}$ may be derived as follows:

$$I_{ref(rms)} = Vc / V_{in(rms)} \quad \text{(Equation 3)}$$

By combining equations 1, 2, and 3, the following equation may be derived:

$$Vc = P_{out} / (\eta \times K)$$

Therefore, in this example embodiment, deriving the second signal (i.e., the Vc signal) may include obtaining the second signal by dividing the output power $P_{out}$ by a product of an efficiency η and the constant K.

However, the example embodiments of the present disclosure is not limited to this. For other PFC controllers having different methods to calculate the reference current $I_{ref}$, the idea is still applicable. For examples, if there is no RMS filter in the PFC controller, then:

$$I_{ref} = Vc \times V_{in} \quad \text{(Equation 3a)}$$

$$I_{ref(rms)} = Vc \times V_{in(rms)}$$

By combining equations 1, 2, and 3a, the following equation may be derived:

$$Vc = P_{out} / \left(\eta \times K \times V_{in(rms)}^2\right)$$

Therefore, according to an example embodiment of the present disclosure, if there is no RMS filter in the PFC controller, the second signal may be obtained by dividing the output power $P_{out}$ by a product of a square of a root mean square value of the input voltage $V_{in}$, the efficiency η, and the constant K.

Back to FIG. 5, in step S506, the voltage controller may be configured according to the second signal so as to keep an output voltage $V_{bulk}$ of the PFC to the DC/DC converter stable.

According to an example embodiment of the present disclosure, the voltage controller may be configured or programmed to generate an output control signal $VCL_{op}$. In this example embodiment, configuring the voltage controller according to the second signal may include, according to the second signal, selectively generating the output control signal $VCL_{op}$ based on a difference between a reference voltage signal and the output voltage $V_{bulk}$ of the PFC, or setting the output control signal $VCL_{op}$ to be equal to the second signal.

When the PFC controller 403 receives the output power $P_{out}$ signal from the DC/DC controller 407, the PFC controller 403 may select whether using the Vc signal or the $VCL_{op}$ control signal for reference current $I_{ref}$ calculation. To avoid interfering with normal PFC operation with a steady load, the Vc signal can be used to replace the $VCL_{op}$ control signal only if their values have a big difference. For example, the power supply output dynamic load is good in 20% (of full load) load step even without this new output power $P_{out}$ feedforward function, but the power supply output dynamic load is worse due to increased overshoot/undershoot of the output voltage $V_{bulk}$ when it has more than a 20% load step. Then, the PFC controller 403 may set the $VCL_{op}$ control signal to be equal to the Vc signal.

Therefore, according to an example embodiment of the present disclosure, configuring the voltage controller according to the second signal (i.e. the Vc signal) may include, when an absolute value of a difference between the second signal and the output control signal $VCL_{op}$ of the voltage controller is greater than a threshold value, setting the output control signal $VCL_{op}$ to be equal to the second signal. The threshold value may be a specific percentage of a value of the output control signal $VCL_{op}$ at a steady state full load. In this example embodiment, the threshold value may be 20% of the value of $VCL_{op}$ at the steady state full load. Note that "20% of full load" is just a reference suggestion, and the present disclosure is not limited to this. The criteria to apply the Vc signal (i.e., the second signal) may be dependent on various applications, and different criteria are included in the present disclosure.

It may be assumed that the voltage control loop is implemented with proportional-integral-derivative (PID) control. However, the present disclosure is not limited to this. The present disclosure is also applicable to different kinds of controllers.

In the following, a detailed description of how to configure the voltage controller according to the Vc signal under the PID control is provided.

The PID algorithm refers to the proportional-integral-derivative control, which is a common "stability keeping" control algorithm. Conventional PID control may involve a proportional variable, an integral variable, and a derivative variable.

Proportional variable (n)=$K_p \times V_{err}$(n), where $K_p$ is a proportional gain. As shown in FIG. 4, $V_{err}$ is the voltage error signal calculated by the difference of the reference voltage $V_{ref}$ and the output voltage $V_{bulk}$ ($V_{ref}-V_{bulk}$).

Integral variable (n)=integral variable (n−1)+$K_i \times V_{err}$(n), where the constant $K_i$ is an integral gain.

Derivative variable (n)=$K_d$ ($V_{err}$ (n)−$V_{err}$ (n−1)), where the constant $K_d$ is a derivative gain.

Therefore, when $abs(VCL_{op}-Vc) \le VCL_{op\_FL} \times 20\%$, where $VCL_{op\_FL}$ is the value of $VCL_{op}$ at the steady state full load:

$$VCL_{op} = \text{Proportional variable} + \text{Integral variable} + \text{Derivative variable.}$$

When $abs\ (VCL_{op}-Vc) > VCL_{op\_FL} \times 20\%$:

$VCL_{op}=Vc$, and the integral variable=Vc.

The purpose of updating the integral variable is to make the voltage controller jump to the state that matches the latest input power. Then the voltage controller may continue working in this state without waiting for slow integral term changing to the expected value (for example, $V_{err}$ will be near zero after applying Vc).

For controllers other than the PID controller, the related state variables may be changed to make the voltage controller jump to the state that matches the latest input power.

Therefore, according to an example embodiment of the present disclosure, when setting the output control signal $VCL_{op}$ to be equal to the second signal, related state variables of the voltage controller may be changed at the same time so that the voltage controller jumps to a state that matches the latest input power.

Therefore, as mentioned above, the PFC controller executing the method 500 according to the example embodiment may eliminate the overshoot or undershoot in the output voltage $V_{bulk}$ when the DC/DC converter output experiences a high step load. The stable output voltage $V_{bulk}$ improves the output voltage $V_{out}$ dynamic response of the DC/DC converter, and at the same time keeps the PFC voltage control loop response slow so that the input power factor and the iTHD performance are not affected.

Figure 6A:
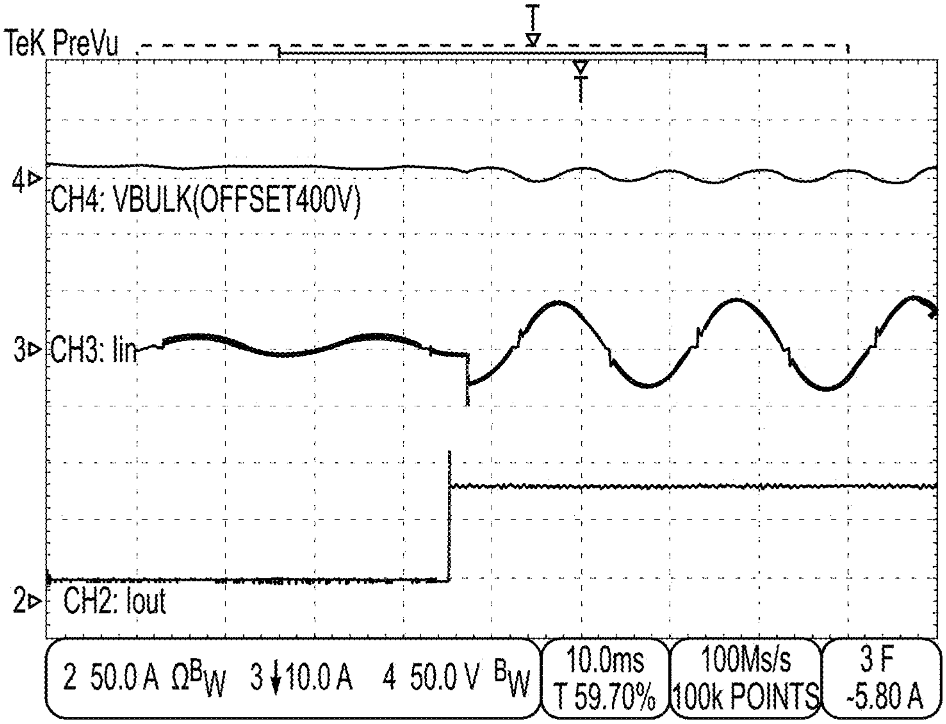
FIGS. 6A and 6B respectively show a change in the the output voltage $V_{bulk}$ of the PFC when the DC/DC converter output experiences a high step load under the control of the PFC controller according to an example embodiment of the present invention.
Figure 6B:
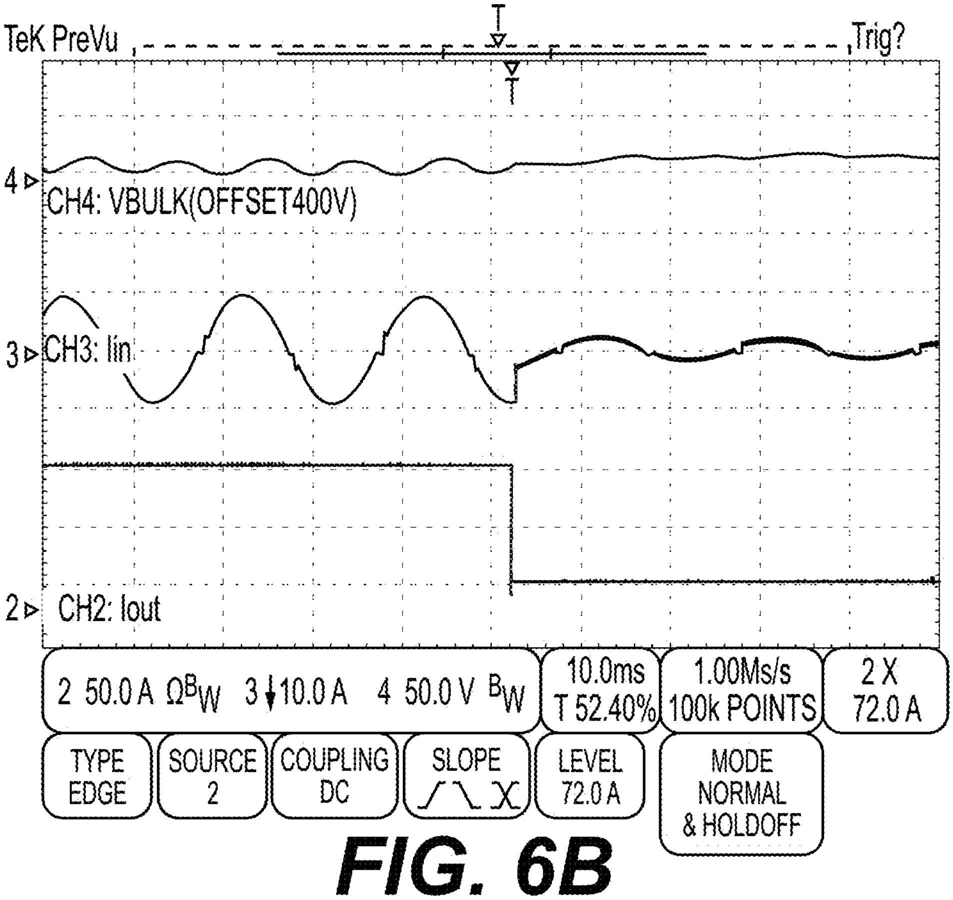

FIGS. 6A and 6B respectively show a change in the output voltage $V_{bulk}$ when the DC/DC converter output experiences a high step load under the control of the PFC controller according to an example embodiment of the present disclosure. It may be seen from FIGS. 6A and 6B that, when the output current Iout changes from about 20 A to about 120 A and from about 120 A to about 20 A, the output voltage $V_{bulk}$ has no undershoot and overshoot in the load steps, thereby achieving the stability of the output voltage $V_{bulk}$.

Figure 7:
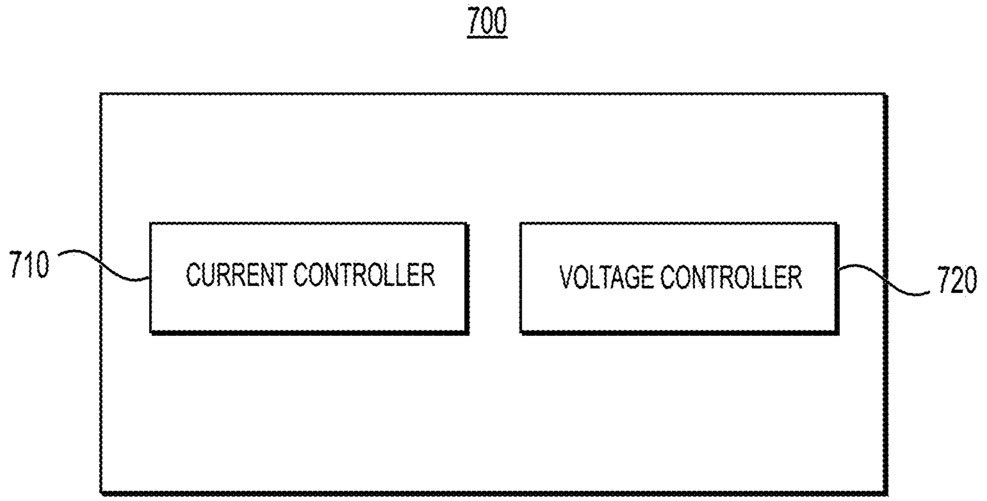
FIG. 7 shows a PFC controller according to an example embodiment of the present invention.

FIG. 7 shows a PFC controller 700 according to an example embodiment of the present disclosure. The PFC controller 700 may be used to control the PFC shown in FIG. 4. The PFC controller 700 may include a current controller 710 and a voltage controller 720, as shown in the figure. The PFC controller 700 may be configured or programmed to execute the operations described in FIG. 5.

The present disclosure refers to the block diagrams and/or flowcharts of computer-implemented methods, apparatuses (systems and/or devices), and/or computer program products to describes exemplary example embodiments. It should be understood that blocks in block diagrams and/or flowcharts and the combination of blocks in block diagrams and/or flowcharts may be achieved through computer program instructions executed by one or more computer circuits. These computer program instructions may be provided to processor circuits such as general-purpose computer circuits, specialized computer circuits, and/or other programmable data processing circuits to generate machines, so that transistors, values stored in memory locations, and other hardware components within such circuits are converted and controlled via instructions executed by processors of computers and/or other programmable data processing apparatuses, to achieve the functions/actions specified in the block diagrams and/or flowcharts, thereby creating apparatuses (functional entities) and/or structures for achieving the functions/actions specified in the block diagrams and/or flowcharts.

These computer program instructions may also be stored in tangible computer-readable mediums, which may guide computers or other programmable data processing apparatuses to function in specific ways, such that the instructions stored in the computer-readable mediums generate products, including instructions that achieve the functions/actions specified in the blocks of the block diagrams and/or flowcharts. Therefore, the example embodiments of the present disclosure may be achieved on hardware and/or software (including firmware, resident software, microcode, etc.) running on processors such as digital signal processors, which may be collectively referred to as “circuits”, “modules”, or variants thereof.

The references to “an example embodiment”, “example embodiment”, etc. in the present disclosure indicates that the described example embodiments may include specific features, structures, or characteristics, but not every example embodiment must include the specific features, structures, or characteristics. Furthermore, these phrases may not necessarily refer to the same example embodiment. In addition, when describing specific features, structures, or characteristics in conjunction with example embodiments, it should be considered that implementing such features, structures, or characteristics in conjunction with other example embodiments (whether explicitly described or not) is within the knowledge scope of those skilled in the art.

It should be understood that although the terms “first”, “second”, etc. may be used in the present disclosure to describe various elements, these elements should not be limited by these terms. These terms are only used to distinguish elements from each other. For example, within the scope of the present disclosure, the first element may be referred to as the second element, and similarly, the second element may be referred to as the first element. As used in the present disclosure, the term “and/or” includes any and all combinations of one or more of the relevant listed items.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of controlling a power factor corrector (PFC) that is configured or programmed to receive an input power and to supply a power to a load via a DC/DC converter, the method being executable by a PFC controller configured or programmed to control the PFC, the PFC controller including a voltage controller, the method comprising:

receiving a first signal transmitted from a DC/DC controller configured or programmed to control the DC/DC converter, the first signal indicating the load;

deriving a second signal based on the first signal, the second signal being an expected output control signal of the voltage controller under the load indicated by the first signal; and configuring the voltage controller according to the second signal so as to keep an output voltage $V_{bulk}$ of the PFC to the DC/DC converter stable, wherein the voltage controller is configured or programmed to generate an output control signal $VCL_{op}$; and the configuring the voltage controller according to the second signal includes, according to the second signal, selectively generating the output control signal $VCL_{op}$ based on a difference between a reference voltage signal and the output voltage $V_{bulk}$ of the PFC, or setting the output control signal $VCL_{op}$ to be equal to the second signal.

2. The method according to claim 1, wherein the PFC controller further includes a current controller, the current controller is configured or programmed to receive a difference of a current $I_{PFC}$ of the PFC and a product of a reference current signal and a constant K as an input so that the current $I_{PFC}$ of the PFC is controlled to be equal to the product of the reference current signal and the constant K; and the constant K is a constant scaling factor.

3. The method according to claim 1, wherein the first signal is an output power $P_{out}$ of the DC/DC converter.

4. The method according to claim 3, wherein the deriving a second signal includes obtaining the second signal by dividing the output power $P_{out}$ by a product of an efficiency $\eta$ and a constant K;

the efficiency $\eta$ indicates an efficiency of supplying the power to the load from the input power;

the constant K is a constant scaling factor, and a current $I_{PFC}$ of the PFC is controlled to be equal to a product of a reference current signal and the constant K; and the reference current signal is obtained based on an output control signal $VCL_{op}$ of the voltage controller and an input voltage $V_{in}$ of the PFC.

5. The method according to claim 4, wherein there is no root mean square (RMS) filter in the PFC controller, and the second signal is obtained by dividing the output power $P_{out}$ by a product of a square of a root mean square value of the input voltage $V_{in}$, the efficiency $\eta$, and the constant K.

6. The method according to claim 1, wherein the configuring the voltage controller according to the second signal includes:

when an absolute value of a difference between the second signal and the output control signal $VCL_{op}$ is greater than a threshold value, setting the output control signal $VCL_{op}$ to be equal to the second signal, and changing a related state variable of the voltage controller so that the voltage controller jumps to a state that matches a latest input power.

7. The method according to claim 6, wherein the threshold value is a specific percentage of a value of the output control signal $VCL_{op}$ at a steady state full load.

8. The method according to claim 6, wherein the voltage controller uses a proportional-integral-derivative PID control; and the configuring the voltage controller according to the second signal includes:

when the absolute value of the difference is less than or equal to the threshold value, determining a sum of a proportional variable, an integral variable, and a derivative variable as the output control signal $VCL_{op}$; and when the absolute value of the difference is greater than the threshold value, setting the output control signal $VCL_{op}$ to be equal to the second signal, and setting the integral variable to be equal to the second signal.

9. The method according to claim 1, wherein the first signal transmitted from the DC/DC controller is received via a signal transmitter across a safety isolation barrier between the PFC controller and the DC/DC controller.

10. The method according to claim 1, wherein the first signal is transmitted in a digital form; and transmission of the first signal, including an encoding and a decoding, is completed within a half milli-second.

11. A power factor corrector (PFC) controller configured or programmed to control a PFC, the PFC being configured or programmed to receive an input power and to supply a power to a load via a DC/DC converter, the PFC controller includes a voltage controller and is configured or programmed to:

receive a first signal from a DC/DC controller, the first signal indicating the load;

derive a second signal based on the first signal, the second signal being an expected output control signal of the voltage controller under the load indicated by the first signal; and configure the voltage controller according to the second signal so as to keep an output voltage $V_{bulk}$ of the PFC to the DC/DC converter stable, wherein the voltage controller is configured or programmed to generate an output control signal $VCL_{op}$; and configuring the voltage controller according to the second signal includes, according to the second signal, selectively generating the output control signal $VCL_{op}$ based on a difference between a reference voltage signal and the output voltage $V_{bulk}$ of the PFC, or setting the output control signal $VCL_{op}$ to be equal to the second signal.

12. A power supply apparatus comprising:

a DC/DC converter;

a power factor corrector (PFC) configured or programmed to receive an input power and to supply a power to a load via the DC/DC converter;

a DC/DC controller configured or programmed to control the DC/DC converter and transmit a first signal; and a PFC controller configured or programmed to:

receive the first signal from the DC/DC controller, the first signal indicating the load;

derive a second signal based on the first signal, the second signal being an expected output control signal of a voltage controller included in the PFC controller under the load indicated by the first signal; and configure the voltage controller according to the second signal so as to keep an output voltage $V_{bulk}$ of the PFC to the DC/DC converter stable, wherein the voltage controller is configured or programmed to generate an output control signal $VCL_{op}$; and configuring the voltage controller according to the second signal includes, according to the second signal, selectively generating the output control signal $VCL_{op}$ based on a difference between a reference voltage signal and the output voltage $V_{bulk}$ of the PFC, or setting the output control signal $VCL_{op}$ to be equal to the second signal.

13. The power supply apparatus according to claim 12, wherein the configuring the voltage controller according to the second signal further includes:

when an absolute value of a difference between the second signal and the output control signal $VCL_{op}$ is greater than a threshold value, setting the output control signal $VCL_{op}$ to be equal to the second signal, and changing a related state variable of the voltage controller so that the voltage controller jumps to a state that matches a latest input power.

14. The power supply apparatus according to claim 12, further comprising a safety isolation barrier between the PFC controller and the DC/DC controller; wherein the power supply apparatus further includes a signal transmitter, and the DC/DC controller transmits the first signal to the PFC controller via the signal transmitter.

* * * * *